Aug. 5, 1958 J. C. LANG 2,845,626
STAPLING APPARATUS
Filed Nov. 9, 1955 5 Sheets-Sheet 1
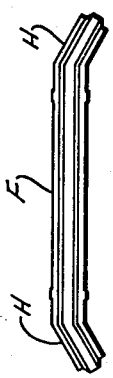
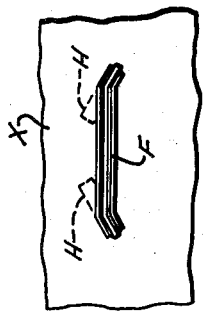
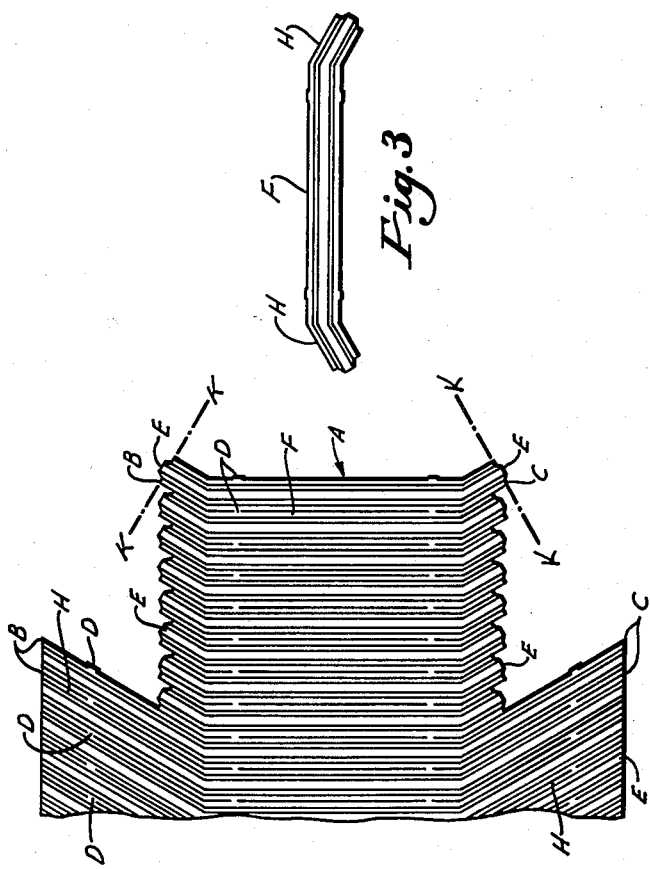
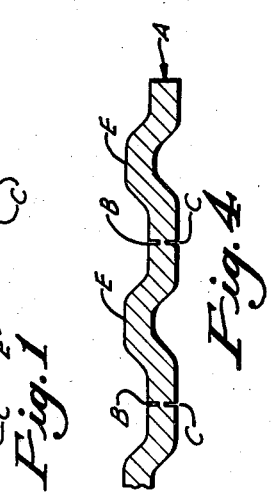
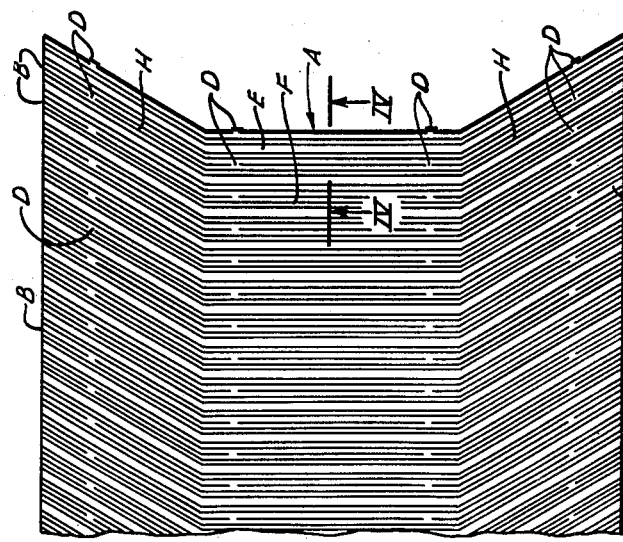
INVENTOR.
JOSEPH C. LANG
BY
HIS ATTORNEYS

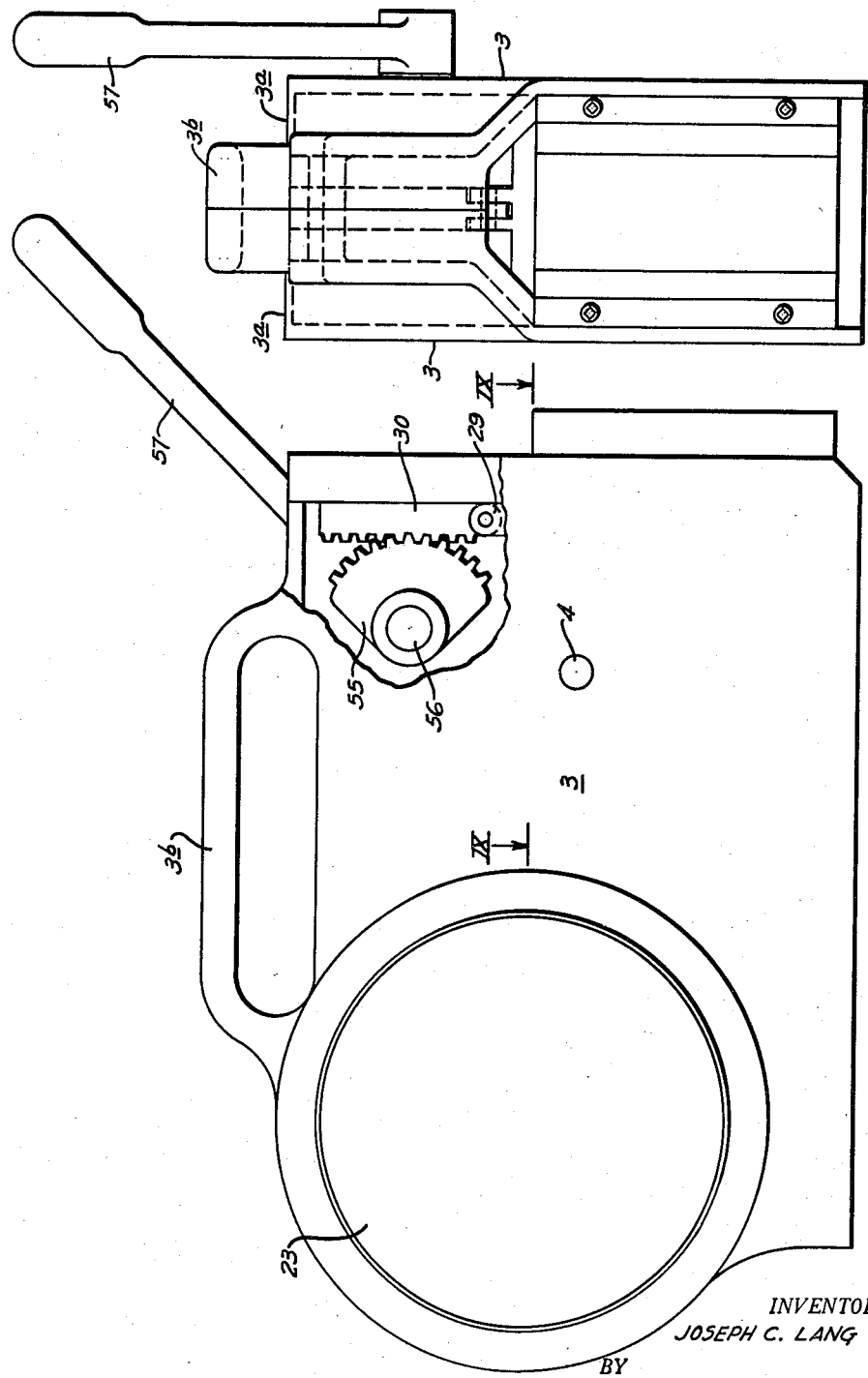

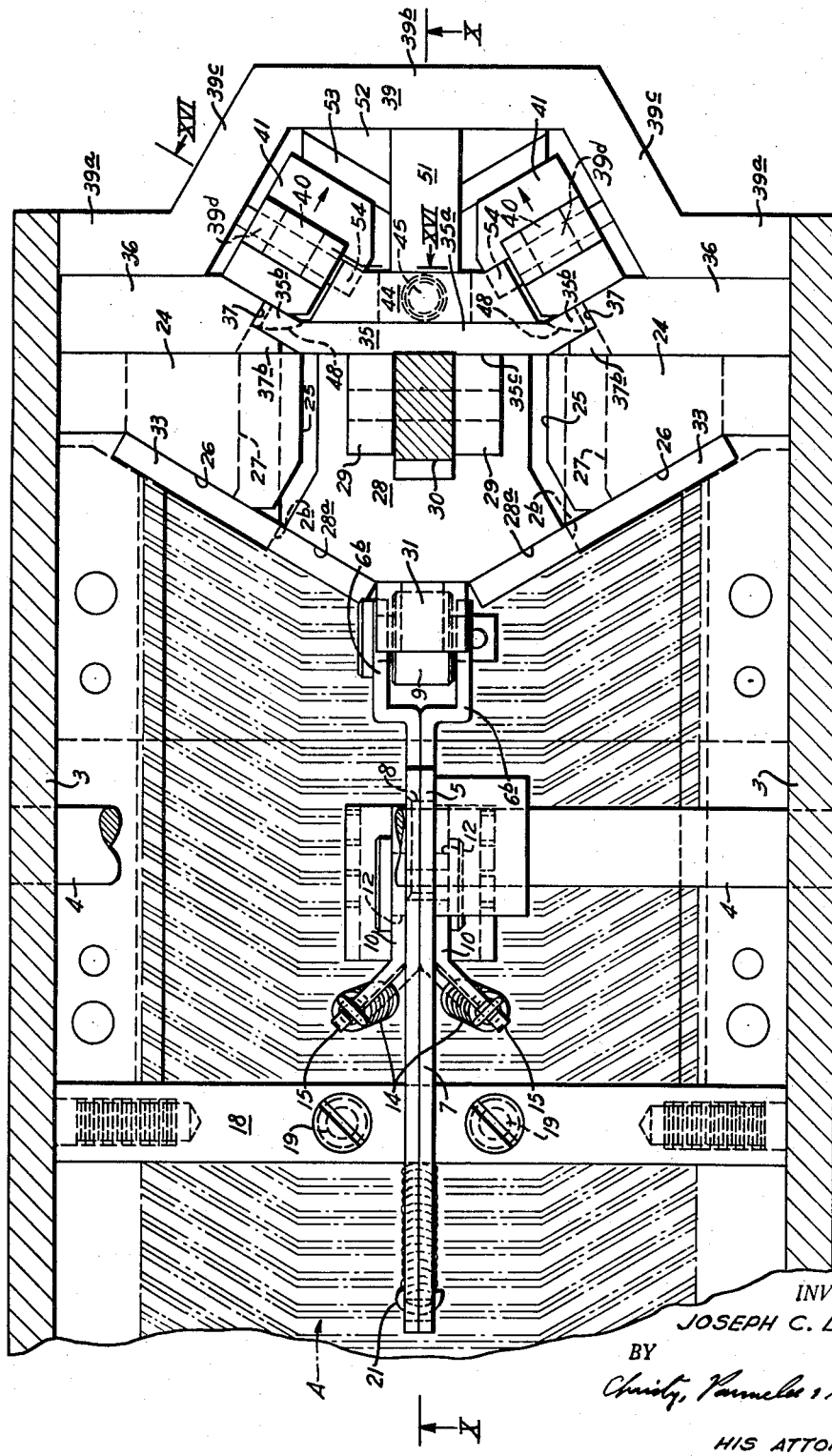

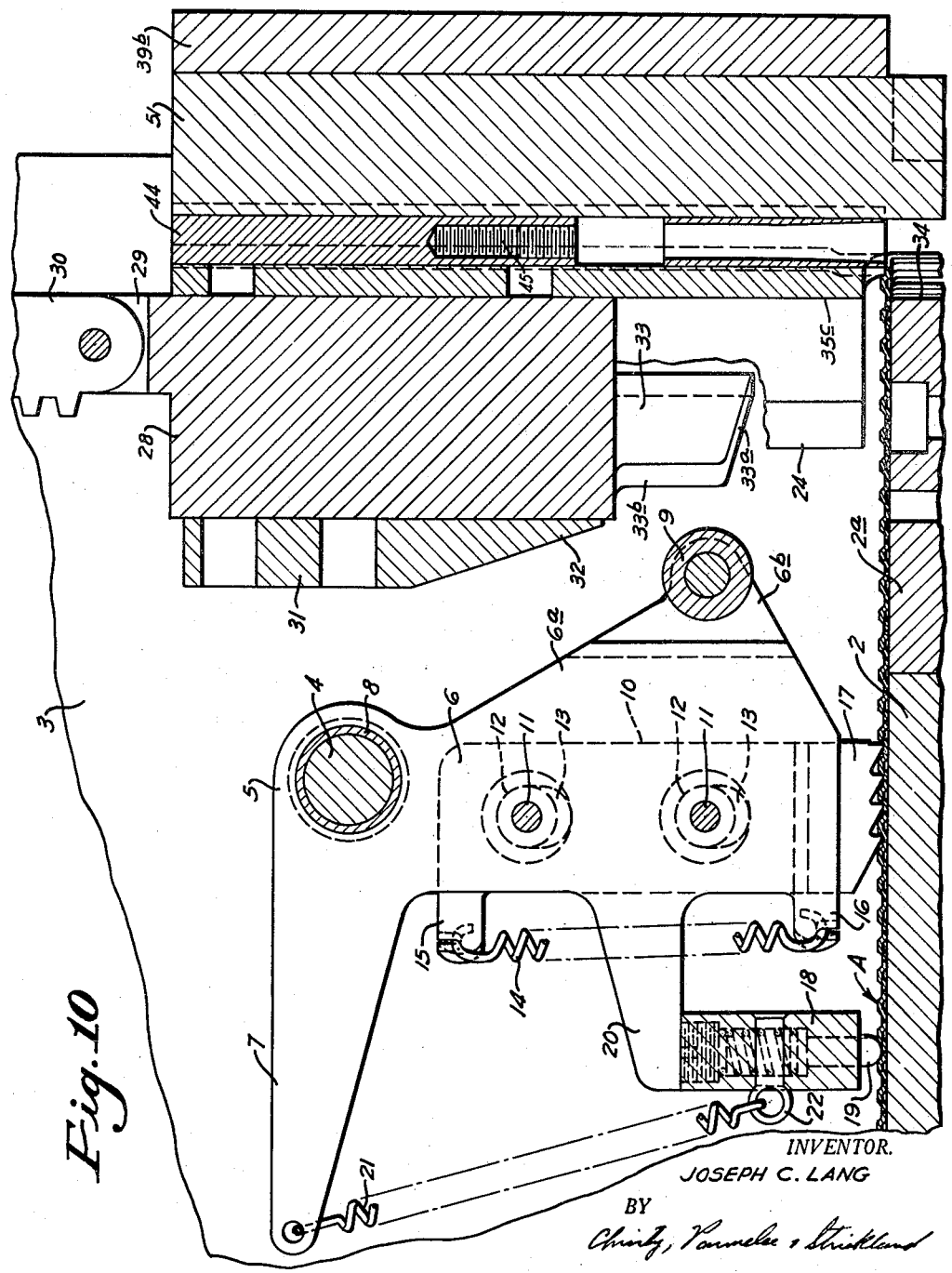

Aug. 5, 1958　　　　J. C. LANG　　　　2,845,626
STAPLING APPARATUS
Filed Nov. 9, 1955　　　　　　　　　　5 Sheets-Sheet 5
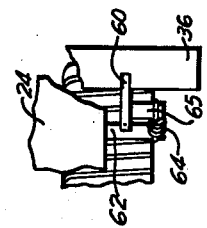
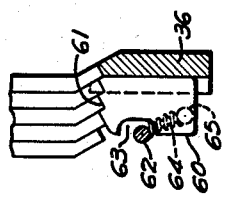
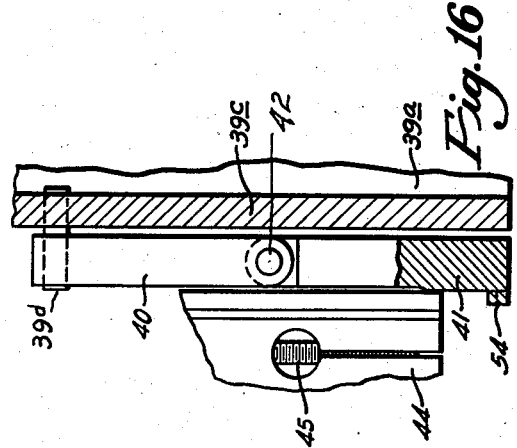
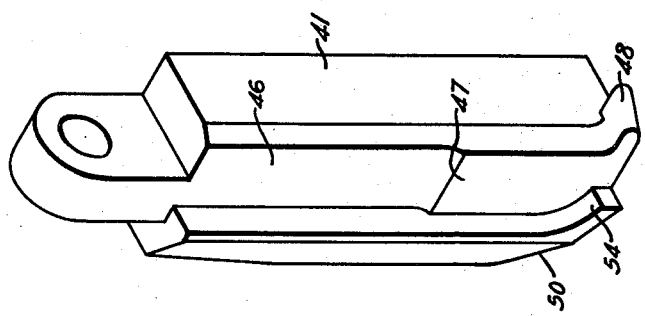
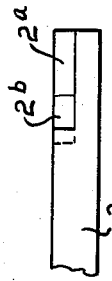
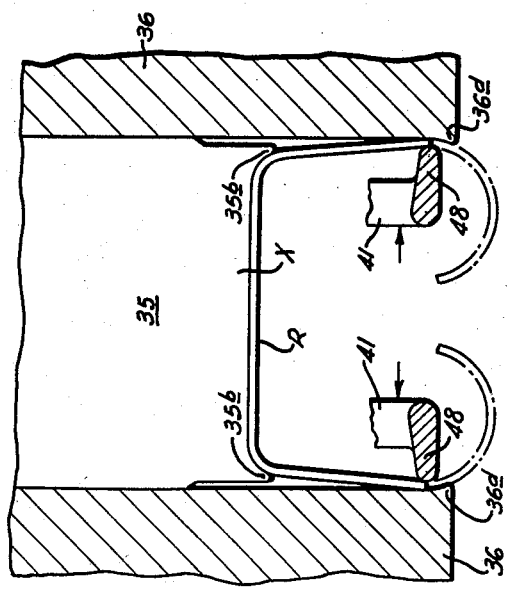
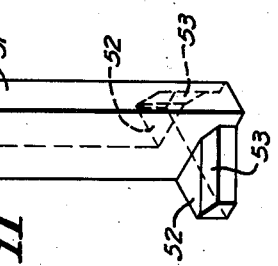
INVENTOR.
JOSEPH C. LANG
BY
HIS ATTORNEYS United States Patent Office 2,845,626
Patented Aug. 5, 1958

2,845,626

STAPLING APPARATUS

Joseph C. Lang, Pittsburgh, Pa., assignor to Bocil Corporation, Pittsburgh, Pa., a corporation of Delaware Application November 9, 1955, Serial No. 545,929

18 Claims. (Cl. 1—48.1)

This invention is for an apparatus for driving staple-like fasteners, and while many features thereof have utility in driving such fasteners into any surface in which they are to be used, the invention is further directed to and specifically described in connection with the driving of the fasteners into the overlying folds of a box or carton to effect the clinching of the staple within the thickness of the folds without penetration into the space within the carton and without the reaction against any underlying anvil. It is also applicable to the driving of such staples into fiberboard or like material of a soft nature where clinching of the legs of the staple is necessary to develop the required holding power.

Since, as above indicated, the invention has special application to the clinching of staples during driving, it will be described specifically in this connection, but without any intention of limiting the invention or excluding therefrom novel features of broader application.

It might first be explained that in my copending application Serial No. 377,457, filed August 31, 1953, I have disclosed what I call an "oblique staple," or "oblique legged staple." It is characterized by the fact that the legs are in a plane or planes oblique to a plane projected vertically through the long axis of the bridge of the staple, the legs being in either parallel planes with each other or divergent planes. The driver here shown is illustrated for use with a staple that is cut from a ribbon of metal with the center of the ribbon forming the bridge of the staple, and the leg-forming elements cut from the margins of the strip are angularly projected from the ends of the bridge. In the blank strip the center portion forming the bridge is severed crosswise of the strip, while the leg-forming elements, formed from the marginal areas of the strip are cut at an angle to both the transverse and longitudinal axes of the strip, and hence extend angularly or obliquely, to the bridge portion. In use these leg-forming portions are bent downwardly on a bend line that extends transversely of the axes of the legs, not of the bridge, so that as driven, these legs are in planes that are at an oblique angle to a plane passing vertically through the longitudinal axis of the bridge instead of being at right angles thereto, as with a conventional staple formed in the usual manner from flat wire. This not only has the important advantage of increasing the holding power of the staple in soft material, such as box-board, but also when so formed from strip, the legs are cut diagonal to the grain of the metal strip, instead of crosswise, and hence have a demonstrable greater strength. Important advantages are to provide a staple which has the strength of a staple cut and bent from a length of wire, and greater holding power in soft material than a conventional staple. Other advantages are to provide a staple which is cheaper than wire, and capable of imparting greater capacity to the driver while compacting it and reducing its weight. In other words the large spools required for wire, the complexity of forming and other problems contribute to the size and weight and usefulness of the driving tool, while the oblique staples as so formed from strip enables more staples to be produced from a roll of material of a given length, contributing to large capacity in a compact driving unit.

Because of the oblique disposition of the legs of the staple, all operations of driving must be adapted to this arrangement, for which reason the accompanying specification and drawings must be viewed with this in mind, but the invention can well be adapted to the driving of conventional U-shaped staples formed of flattened wire, and in its broader aspects my invention should be considered applicable to the driving of any staple, albeit that certain further elements of novelty arise by reason of the specific problems of driving oblique staples.

My invention has among its principal objects an apparatus for driving staples and clinching them as they are driven within the material itself and without the use of an anvil; the driving of oblique staples, and finally the driving and clinching of such oblique staples in the manner above indicated. These and other objects and advantages are secured by my invention as will be apparent from the further description of my invention in conjunction with the accompanying drawings, in which:

Fig. 1 is a plan view on an enlarged scale of a prepared fastener strip designed for use in the driver constituting the present invention;

Fig. 2 is a similar view of the same strip after the leading end has entered the driver and been operated upon;

Fig. 3 is a top plan view of the finished staple as it transiently exists before driving;

Fig. 4 is an enlarged transverse section in the plane of line IV—IV of Fig. 1;

Fig. 5 is a vertical section on a normal scale showing the driven staple joining two overlying layers of boxboard;

Fig. 6 is a top plan view of Fig 5;

Fig. 7 is a side elevation of a complete machine embodying my invention;

Fig. 8 is a front elevation of the machine shown in Fig. 7;

Fig. 9 is a section on a larger scale in substantially the plane of line IX—IX of Fig. 7, parts being omitted for purposes of illustration;

Fig. 10 is a vertical section in approximately the plane of line X—X of Fig. 9;

Fig. 11 is a perspective view of the back-up element which cooperates with the two die blocks that effect bending of the legs;

Fig. 12 is a distorted schematic view illustrating the relation of the leg bending elements to the guide, the view representing the parts in the plane which they would occupy if the staple were a conventional flat staple;

Fig. 13 is an enlarged perspective view of one of the two die or pressure blocks;

Fig. 14 is a fragmentary view in horizontal section showing means for preventing the staple when being sheared from cocking rearwardly;

Fig. 15 is a fragmentary sectional view in vertical section of the parts shown in Fig. 14;

Fig. 16 is a vertical section in the plane of line XVI—XVI of Fig. 9 showing the pressure blocks and pivotal links (omitted from Fig. 9) from which the blocks are hung for movement in two directions; and Fig. 17 is a fragmentary side elevation on a smaller scale of the forward end of the base removed from the machine.

Referring to the drawings, an understanding of the machine here shown will be more apparent by a brief explanation of Figs. 1 to 6, since the peculiar angular formation of the fastener requires that many elements of the driver mechanism be angularly disposed with respect to the longitudinal and transverse axes of the machine, and for this reason are slightly more difficult to comprehend.

In Fig. 1 I have shown a short length of a strip of connected fastener blanks before any engagement thereof by the driver at all. This strip A is made from a ribbon of flat metal that is first sheared along the parallel lines B—C, the shearing severing or fracturing the metal along cleavage lines indicated in Fig. 4. The lines B—C are not continuous, but are interrupted at intervals D so that the blanks remain firmly connected. After shearing, the metal constituting a staple blank between each two lines B—C is embossed as indicated at E (best seen in Fig. 4) to form a ridge along the full top of the blank. As seen from the drawings, and as more fully explained in my aforesaid application Serial No. 377,457, filed August 31, 1953, the strip has a central area F, in which the lines B—C extend transversely and margin portions H in each of which the lines B—C extend angularly to the longitudinal axis of the strip from which the blank is severed and formed; the parts H are the leg-forming portions of the blank, while the part F (and the innermost ends of H) constitute the bridge or top of the staple.

In the operation of the machine to be hereinafter described, the strip of metal thus formed into a succession of blanks is unrolled from a magazine, and advanced, one blank at a time through the machine by a feeding mechanism indexed by the contour of the strip. At the first stage in the operation of driving, the leg-forming elements H are successively bent downwardly on a bend line K—K (Fig. 2) that is at right angles to the length of the portions H and oblique to the bridge-forming elements F. The leg portions are thus turned down to staple form, but instead of being in parallel planes transverse to the axis of the bridge as with conventional staples, they are in planes which converge forwardly (toward the right) as viewed in Fig. 2, the lines K showing the planes in which the legs would lie. During this bending the parts D connecting the leg elements will be sheared, but the parts D connecting the bridge portions of successive blanks are not severed.

When the blank with the legs bent down has progressed a distance of several blanks, eight steps being shown in Fig. 2 (during which time the seven succeeding blanks will also have had their legs turned down in like manner) the blank will be completely sheared from the leading end of the strip and driven.

As it is driven the staple legs will be guided and confined by elements that tend to curl the legs, so that as they penetrate the substance into which they are driven, they are having an arcuate or loop form imparted to them. This is shown in Figs. 5 and 6 illustrating the finished staple in driven condition and the operation is diagrammed in Fig. 12. In Figs. 5 and 6 X and Y are lapped flaps of a box or carton. The top flap X is the one against which the staple is first driven, and as the driving progresses, the legs fold or curve before the pass through flap Y, thus firmly joining the flaps and requiring in most instances the tearing of the paper in order to open the carton. This holding power, as is evident from Fig. 6, is increased because of the angular disposition of the legs of the staple which have their terminals converging but projecting away from the bridge of the staple. This condition is especially good with corrugated box-board because the legs must always be diagonal to the corrugation.

Blank feeding

Coming now to the machine itself, the machine comprises a base block 2 formed in two parts. This base provides an area on which the strip A is supported. At each side of the face are upwardly-extending side plates 3 and a shaft 4 (see Fig. 10) extends across between the plates at a distance above the plane of the strip. The shaft provides a pivotal support for a bell-crank member 5 having a downwardly-extending arm 6 and a rearwardly-projecting arm 7.

As best seen in Fig. 9, the bell crank is made of two sheet metal stampings placed face-to-face with a bushing at 8 to fit on the shaft 4.

The depending arm 6 has a forward extension 6a, the two plates forming this nose having spaced terminal portions 6b (Fig. 9) between which is a cam roller 9. Embracing the two plates forming the vertical arm of the bell crank is a slide plate 10 formed of two like sheet metal stampings, there being fixed pins 11 in the arm 6, on which are rollers 12 engaging in vertically elongated slots 13 in the double slide plate 10 so that it may freely move up and down a limited distance. Two like springs 14, each attached at one end to a lug 15 on the slide plate and at its other end to a lug 16 on the lower end of the crank arm 6 resiliently urge the slide plate downwardly. The lower end, or more strictly the lower ends of the two plates which function in unison as a single plate, have a series of ratchet-like teeth 17 at the bottom thereof, the spacing of the teeth conforming to the spacing of the ridges of the strip of blanks. These teeth have their forward (right as viewed in Fig. 10) faces vertical and their opposite faces sloped.

There is a crossbar 18 extending between the plates rearwardly of the shaft 4 and at a lower level. It has a pair of spring biased pin elements 19 therein, the terminals of which press down on the strip A. Bell crank arm 6 has a rearward extension 20 (Fig. 9) that overhangs this crossbar. This limits the downward or counterclockwise rocking movement of the bell crank. A spring 21 has one end connected to an eye 22 on the crossbar, and its other end connected to the rearwardly-extending arm 7 of the bell crank and creates a force tending to rock the bell crank in a counterclockwise direction.

In operation, when the driver assembly, to be subsequently described, is forced down, it has a cam 32 which engages the roller 9, pushing down on the roller and moving the bell crank in a clockwise direction as viewed in Fig. 10. During this movement the teeth 17 of the slide plate 10 ride back over the strip A while the spring detent pins 19 hold the strip itself from rearward movement. When the driver lifts to clear the cam roller 9, the spring 21 operates to return the bell crank to the position shown in Fig. 10, and in so moving the bell crank, the ratchet teeth 17 catch in the ribs E of the strip 8 and slide the strip forward one notch, i. e., the distance of one blank.

As shown in Fig. 7, the side plates 3 rearwardly of the feeding mechanism, provide between them a circular chamber 23 into which a coil of strip can be placed, and from which the end may be "threaded" under the feeder, the feeder permitting the pushing of the end of the strip forwardly, but preventing any retracting movement of it. The side plates have inwardly-turned top flanges 3a (Fig. 8) forming a top closure, and on these are provided matching handle portions 3b (Fig. 7) which are provided for a portable machine. For a fixed box closing machine a different form of housing is adapted to the frame in which it is supported.

Leg bending

Between the side plates forwardly of the feeding mechanism are two spaced uprights or stanchions 24 (see Figs. 9 and 10) which have parallel confronting faces 25 and outwardly divergent rear faces 26. These uprights are undercut as indicated by the dotted lines 27 in Fig. 9, the arrangement being such that the ends of the wide strip before the legs are bent downwardly (see for example Fig. 2) will hit the faces 26 and prevent further forward travel, but when the leg portions are bent down they will be clear of the faces 26 and ride along under the undercut to the point of final shearing.

Guided between the stanchions 24 is an operating head or block 28 having ears 29 thereon to which is pivotally attached a rack 30 (see Fig. 10) by means of which the block is raised and lowered. On the front of this block there is secured a nose piece or cam 31 having a tapered lower end 32 and this overhangs the cam roller 9, so that when the block, constituting part of the driver assembly is moved down, the roller 9 is engaged to retract the feeder, and which then allows the feeder to move forward when the head or block rises. The forward feed of the strip is thus effected and restricted by the surfaces 26.

The block itself has two wing-like die elements 33 secured to divergent side faces 28a thereof, and which bear against the surfaces 26 of the stanchions. These wings, as shown in Fig. 10, project below the block 28 and have inclined bottom surfaces 33a that are lowest at their outer ends and vertical surfaces 33b.

The base block 2 is flat, but at its forward end it has a step with a portion at a lower level on which is a flat narrow strip 2a forming a ridge which the wing-like die elements straddle as the head 28 moves down. This ridge has a portion at each side which flares, providing angular surfaces 2b down which the bending of the legs takes place. The wing dies engage the leg elements of the endmost unbent blank on the strip on each downward stroke of the head or plunger block 28 and bend the legs down as shown in Fig. 2. The portion of the strip with the bent-down legs then rides along the flat ridge-like portion 2a to the point of final severance.

*Driving the fastener*

On the forward face of the plunger or head 28 is the cut-off and driving die, designated generally as 35. It has a flat portion 35a that is against the front face of the head, and it has an angularly projecting wing 35b along each edge. The ridge-like piece 2a terminates at 34 at the plane of the inner face of the die plate 35 so that as this inner face, designated 35c in Fig. 9 rides down past the end of the ridge 34, the single projecting fastener blank will be sheared off. The bottom edge of the plate 35 will exert pressure on the top or bridge of the staple, while the bottom faces of the wings 35b will be over and exert downward pressure on the angular end portion H of the staple blank that form part of the bridge.

Secured to the forward face of each of the uprights or stanchions 24 is a guide 36, these guides 36 extending down flush with the bottom face of the base. These two plates of course extend up along each side of the die plate 35 and have angular faces 37 on which the edges of the wing elements 35b ride and are guided. They also have triangular flanges 37b that fit behind the wings. At the level where the staples are projected under the cut-off and driving die 35 these triangular flanges 37b are cut away so that the legs of the staple may be pushed under the wings 35b. Below this level the triangular flanges 37b in conjunction with the surfaces 37 form two faces of a guide down which the legs of the staple slide as the staple is driven. At the very bottom of each guide is an inwardly-turned tip or die 36d. This may be best seen in Fig. 12.

Extending forwardly from the guide elements 36 is a bridge plate 39, which as viewed in Fig. 9 is of arch form, having pad portions 39a that abut against the guides 36 and which are secured thereto. It has an intermediate offset portion 39b with angular connecting portions 39c.

Each of the angular connecting portions has a horizontal pivot pin 39d projecting inwardly toward the driver 35 (see Fig. 16). Hung from each of these pins so as to pivot in one plane are links 40. A pressure block 41 is pivotally hung at 42 from each link to pivot at right angles to the direction in which the links pivot, so that the blocks 41 are universally movable in any direction transverse to their vertical axes, but held against any vertical movement.

Secured to the front face of the driver 35 is a cam plate 44 that also moves up and down with the plunger 28 and driver 35, but relative to the blocks 41. It has a screw 45 entered into its lower end, its lower end being split vertically, so that by turning the screw one may adjust within close limits the effective width of the member 44. The cam plate 44 has oblique side faces that confront flat surfaces 46 on the pressure blocks 41. As shown in Fig. 13 each surface 46 has a riser at 47 so that as the cam plate 44 moves down between these risers, the pressure blocks 41 will be urged outwardly away from the longitudinal center of the machine. The blocks 41 have offset tip elements 48 at their lower ends, these tips being located in a plane slightly above the die tips 36d. The downward movement of the cam plate operating against the risers 47 tends to move these tips outward, whereby, shortly after the driving operation is started, pressure will be exerted by the tips 48 against the inner faces of the leg of the fastener. This pressure, in conjunction with the convexed die tips 36d, causes the staple legs to curl, and the disposition of the risers on the pressure blocks is such that the curling starts only after the legs of the fastener have entered the top surface of the material into which the fastener is being driven. In other words there is some slight downward movement of the fastener before the pressure blocks are forced outwardly. That is, the lower ends of the blocks move in a diagonal direction relative to the long axis of the machine, this movement being in a direction normal to or at right angles to the flat inner faces of the fastener legs and to the guide channels in which the legs are guided. In Fig. 12 for clearness of illustration it is shown as a transverse movement. It is because the staple legs are turned at an angle and the pressure blocks actually move in a diagonal direction that the blocks are pivoted for movement in two planes. During driving the legs of the staple are confined in the guide formed in the guide members 36 with their angular faces 37 and parts 37b and also guided by the faces of the blocks 41, channels for the legs being thus provided.

The lower ends of the blocks 41 have a rounded heel 50. On the front face of the cam plate 44 is a bar 51 with a cross part 52 at its lower end, this cross part having beveled surfaces 53 on the faces which confront the blocks 41.

During the downward stroke of the plunger the cross part 52 rides down the outer faces of the blocks 41, forming a back-up cam which keeps the blocks from being forced forwardly, i. e., diagonally to the right as viewed in Fig. 9. Near the end of the downward stroke, the beveled surfaces 53 ride past the rounded heels 50 on the blocks, providing clearance so that the blocks may then swing in the direction of the arrows in Fig. 9. At this same time the end of the cam plate 44 at the front of the driver will engage rounded cam surfaces 54 on the lower ends of the pressure blocks and positively move the blocks in the direction of the arrow, thus withdrawing the die tips 48 on the blocks from the path of travel of the bridge of the fastener and the bottom end of the driver. In so doing these tips can not be broken off or interfere with the fastener being driven fully "home" with its bridge tight against the top surface of the material into which the fastener is driven.

On the up-stroke of the driver, there is no fastener in the guides, so that all of the parts have free working clearance and the plunger can be easily retracted.

The plunger is here shown as being operated by means of a toothed quadrant 55 on a rock shaft 56 supported by the side plates 3. The pinion meshes with the teeth on the rack 30 and the rock shaft has an operating lever 57, but any other suitable mechanism may be used, depending upon whether the machine is designed as a portable unit, as shown, or is a fixed box closing machine with power operation.

In Fig. 12 I have shown schematically the driving of the fastener, the parts being transposed to the plane they would occupy if the staple were a conventional staple instead of one in which the fasteners have obliquely disposed legs. In this view, the fastener, designated R, is in position under the driver X in position to be driven. It will be noted that the legs, instead of being absolutely vertical, diverge downwardly to a slight angle and there is a noticeable arc joining the legs to the bridge, the arc being on a radius which is appreciable. This is important, because the bridge of the staple can pass between guide tips 36d.

The lower end of the driver X is contoured as shown to conform to the contour of the fastener and is actually grooved at the bottom to accept the embossed rib (E in Fig. 4) of the fastener. The guides are marked 36, and the guide tips 36d are shown at the exact correct radius. The tips 48 of the pressure blocks 41 are only schematically illustrated but in their exact contour and relation to the die tips.

As the staple starts down there is no pressure on the blocks 41 and the lower ends of the fastener ride past the die tips with little deflection, but when they have just begun to penetrate the surface on which the tool is set, pressure in a direction normal to the flat plane of the legs is applied tending to spread the blocks 41 and the metal of the staple leg is then moving under pressure between two substantially parallel or concentric surfaces defined by the convex nose 48 of block 41 and concave surface 36d, causing the metal to curl as indicated in dotted lines. When the bridge of the staple has traveled down to almost the top of the die elements 48 this pressure is relieved and the blocks are moved in a direction normal to the plane of the illustration out of the path of the bridge of the staple and the driver. The end of the driver is wide enough to just clear the tips of the dies and press the bridge of the staple down tight against the surface into which the staple is driven.

The only difference between Fig. 12 and the actual machine is that because of the oblique shape of the staple, all parts are designed to move in planes required by this angle so that, in the machine shown, the critical parts are in planes different from the planes of the paper sheet on which they are drawn, tending to make the structure appear more complicated than it actually is. Fig. 12, however, illustrates two conditions which are important to this driver. One of these is that the staple guides terminate in curves which are concave with respect to the direction of approach of the staple legs during driving, and that the pressure blocks have rounded tips which are convex and parallel with the concave surfaces of the guide, and the other condition is that these pressure blocks exert a pressure normal to the inner faces of the staple legs and guides during driving of the staple. The driver itself is of a width that permits the driver to pass between the curved terminals of the guide, the pressure blocks at this time having been cammed back out of the path of the driver.

When the plunger moves up, the cam 32 allows the feed mechanism to push the next blank forwardly under the driver.

*Résumé of operation*

The machine is first set down on the surface into which the fastener is to be driven. The operator may hold the machine with his left hand, moving the operating lever 57 in a clockwise direction with his right. This moves the whole plunger assembly down and the legs on one blank are bent down into driving position while the endmost blank, eight stations forwardly, and which is under the driver, is sheared off and driven down. As it is being driven down, the pressure blocks 41 are forced outwardly by the cam plate 44 engaging risers 47 on the blocks, so that the parts 48 press against the inner faces of the staple legs while the blocks are kept tight by the back-up cam 52. As the driver moves down, the cam 32 moves the feeder 17 rearwardly and "clocks" it. Just before the driving stroke is completed, the back-up cam 52 contacts the rounded edges or heels 50 of the blocks 41 allowing clearance for the blocks to kick diagonally forward, and the end of the member 44, riding down the curved cam surfaces 54 on the lower ends of the blocks 41 push the blocks to a position where die parts 48 are clear of the space under the bridge of the staple, and the staple will be driven home.

The operator then raises the handle, restoring the parts to starting position, and effecting the feed of the next blank to a position under the driver.

The machine thus provides a compact driver, capable of curling and clinching the fasteners and driving the fasteners down tight against the material into which the fastener is driven. The machine prepares one blank for driving while driving another. The leg-curling means, after operating, is thereafter pushed from under the fastener. The machine is additionally unique in that it operates on oblique staples, as described.

In the operation of the machine, the foremost staple of the strip is unsupported at the time it is sheared off. This sometimes results in the top of the staple bending down under the pressure of the driver, tilting the legs backwardly so that they do not line up with the staple guide. This can be overcome by anti-tilting means shown in Figs. 14 and 15 where the piece 36 has a horizontal slot milled therein in which is slidably received a transversely movable plate 60 having a series of ratchet-like teeth 61 at its inner end that conform to the angle faces of the staple legs. This plate is at a level where the teeth 61 engage the staple legs near their lower ends. A screw 62 in the under surface of stanchion 24 engages in a notch 63 in the plate 60 to allow this plate to move laterally a limited distance. A spring 64 attached to this screw and to a post 65 on the underside of the plate 60 urges the teeth 61 toward the staples. When shearing pressure is applied to the staple at the left end of Fig. 15 the front tooth 61 keeps the leg from swinging back. When the strip of staples feeds forward, plate 60 is simply cammed back against the pull of the spring and then snaps into engagement with the staple legs when they come to rest.

There are of course two of these ratchet plates, one at each side. Their use is desirable but not necessary, and for clarity of illustration they are not shown in Fig. 9.

I have shown and described in detail one complete embodiment of my invention, but it will be understood that this is by way of illustration and the invention may be otherwise embodied and constructed, and various changes and modifications may be made therein within the contemplation of the appended claims.

I claim:

1. Apparatus for driving staples having two legs to effect clinching during driving comprising a staple guide providing opposed channels to receive and guide the outer faces of the staple legs, a driver movable along the guide, and means movable out of the path of the driver and also movable in a direction normal to the said guides for exerting pressure against the inner faces of the staple legs.

2. Apparatus for driving staples having two legs to effect clinching of the legs during driving comprising a staple guide providing opposed channels to receive and guide the outer faces of the staple legs, said guides terminating in a curve which is concave in respect to the direction of approach of the staple legs during driving with the distance between said curved portions of the end of the guide being sufficient for the working end of the driver to pass between them, a driver movable along the guide, other guide means movable out of the path of the driver having convex surfaces substantially concentric with the concaved surfaces of the guide and which during driving of the staple are in confronting parallel relation with the said concaved surface and are spaced therefrom the thickness of the staple leg to thereby provide a curved path in which the staple leg is confined, and driver actuated means for holding the said other guide means in such position during a portion of the time the staple is being driven.

3. Staple driving apparatus as defined in claim 2 in which means are provided on the driver and other guide means for moving said other guide means clear of the staple when the bridge of the staple reaches the concaved surfaces of the guide.

4. Staple driving apparatus as defined in claim 2 in which means is provided on the driver for urging the convex surfaces of the last named means in a direction normal to the guides so that the staple legs are squeezed between the convex and concave surfaces during the driving of the staple.

5. Apparatus for driving staples having two legs to effect clinching of the legs during driving comprising a staple guide providing opposed channels to receive and guide the outer faces of the staple legs, said guides terminating in a curve which is convex to the direction of approach of the staple legs during driving, a driver movable along the guide, a pair of pressure blocks movable in a direction normal to the guides and also movable in a direction transverse to the first direction of movement, each block having a convex nose thereon which during driving of the staple is opposed to one of the concaved surfaces on the end of the guide to thereby provide a curved passage for each staple leg between one of said nose portions and one of said concaved guide surfaces, means on the driver for applying pressure to said blocks during driving of the staple to keep said nose portions in such relation to the curved guide surfaces and for releasing said pressure when the bridge of the staple is at substantially the point where it will pass between the concaved surfaces and out of the guide and for removing the pressure blocks from the path of the bridge.

6. Apparatus for driving staples comprising a guide having opposed channels to receive the two legs of the staple to be driven, a driver reciprocable in the guide, the discharge end of the guide having surfaces which are concaved, and driver-actuated means for applying pressure to the inner faces of the legs of the staple during a portion of the driving operation, and driver actuated means for withdrawing said last named means from the path of the driver when the staple bridge closely approaches said terminals.

7. Apparatus for driving staples comprising a guide having opposed channels to receive the two legs of the staple to be driven, a driver reciprocable in the guide, the discharge end of the guide having surfaces which are concaved, driver-actuated means for applying pressure to the inner faces of the legs of the staple, means for withdrawing said last named means from the path of the driver when the staple bridge closely approaches said terminals, said driver-actuated means including a pair of pressure blocks mounted for movement in a direction normal to the inner faces of the staple legs and also in a plane at right angles to the first, and cam elements on the driver for effecting movement of said blocks in both directions.

8. Apparatus for driving staples as defined in claim 7 wherein each block has a cam rise on one face through which pressure in a direction normal to the inner faces of the staple legs is exerted, and has a concaved cam surface near its lower end through engagement with which the block is moved in said right angle direction, the driver having an element thereon that engages the rises on the blocks near the beginning of the driving stroke of the driver and having an end portion which engages the concaved cam surface near the lowermost limit of the driving stroke.

9. Apparatus for driving staples as defined in claim 8 wherein another element movable with the driver holds the blocks against movement in said second direction until the time when the driver is near the limit of its driving stroke.

10. Staple driving apparatus comprising a housing with a base having a ridge extending therealong, means for feeding a succession of staple blanks along the ridge, each blank having a bridge portion with a leg forming portion projecting from each end thereof, the leg forming portions being at an angle to the longitudinal axis of the bridge, a vertically reciprocable head in the housing having die elements that straddle the bridge when the head is forced down and which are angularly disposed in planes that coincide with the angularity of the legs whereby said dies turn the leg forming extensions down to form a staple, the legs then being in planes oblique to the plane of the long axis of the bridge, means for advancing the staple so formed and bringing a succeeding blank under said dies, a staple guide having channels obliquely disposed to accept said legs and into which the staples are successively moved, and a driver on said head between said guides and shaped to cooperate with the obliquely disposed leg guides.

11. Apparatus for driving a staple having legs which are in planes oblique to the plane of the long axis of the bridge of the staple, comprising a support, a guide having channels therein to receive the legs, the channels being disposed at angles to accept the obliquely turned legs, a driver mounted on the support for reciprocal movement between and along the guides, the edges of the driver being parallel with the angular faces of the guides.

12. Stapling apparatus comprising a driver, side guides in which the driver reciprocates and in which the legs of the staple to be driven are received, means movable in a direction toward and away from the plane of the driver for exerting pressure against the inner faces of the legs, and means operated by the driver for moving said means into leg engaging position after the start of the driving of the staple and for moving said means out of leg engaging position when the bridge of the staple must clear the same.

13. Stapling apparatus comprising a driver, guides in which the driver is slidably received and which also provide channels to guide the legs of the staple being driven, said guides having inwardly hooked terminal portions over which the legs of the staple move as the staple is being driven, movable forming means having tips which confront but which are in a plane slightly above the inwardly hooked terminal portions of the guides for creating an outward pressure on the staple legs and defining with said hooked terminal portions a curved passage for the legs of the staple, means operated in timed relation with the driver for moving said means into operative position after the driver has started its driving stroke and releasing said means for movement out of the path of the staple as the bridge of the staple approaches the level of said tips whereby the bridge of the staple and the end of the driver may pass below the level of said tips.

14. Stapling apparatus comprising a driver, guides in which the driver is slidably received and which also provide channels to guide the legs of the staple being driven, said guides having inwardly hooked terminal portions over which the legs of the staple move as the staple is being driven, movable forming means having tips which confront but which are in a plane slightly above the inwardly hooked terminal portions of the guides for creating an outward pressure on the staple legs and defining with said hooked terminal portions a curved passage for the legs of the staple, said movable forming means being pivoted at a point above the level of the bridge of the staple when it is first positioned in the guideway for oscillating movement into position where the tips confront the guides to a position clear of the guides, and driver operated means for holding the guides in said position after the driving of the staple has started and until the bridge of the staple is in position where it must move past the tips.

15. Apparatus for driving staples comprising a supporting frame, a vertically movable head on the frame, means for supporting a connected series of fastener blanks on the frame, a vertical stapling guide on the frame toward which the blanks are moved, said blanks having a bridge portion and leg forming elements extending angularly from each end of the bridge forming element, said supporting means terminating at the guide with the end of the support constituting a cut-off die, die elements on the head movable therewith for successively engaging the leg-forming elements of the blank and bending them downwardly in planes which are oblique to the plane of the center line of the bridge, said die elements being located to effect such bending in advance of the guide, whereby the legs are bent downwardly in advance of the blank entering the guide, means for advancing a strip of staples so formed a distance of one blank with each reciprocation of the head, said guide having angularly disposed guide channels to receive the obliquely angled legs of the staple blanks, a driver on said head movable up and down in the guide for shearing the staple blank which is advanced into the guide and driving it, said driver having angular wing portions to bear against the angularly disposed guide channels and apply pressure over the oblique legs.

16. Apparatus for driving staples comprising a supporting frame, a vertically movable head on the frame, means for supporting a connected series of fastener blanks on the frame, a vertical stapling guide on the frame toward which the blanks are moved, said blanks having a bridge portion and leg forming elements extending angularly from each end of the bridge forming element, said supporting means terminating at the guide with the end of the support constituting a cut-off die, die elements on the head movable therewith for successively engaging the leg-forming elements of the blank and bending them downwardly in planes which are oblique to the plane of the center line of the bridge, said die elements being located to effect such bending in advance of the guide, whereby the legs are bent downwardly in advance of the blank entering the guide, means for advancing a strip of staples so formed a distance of one blank with each reciprocation of the head, said guide having angularly disposed guide channels to receive the obliquely angled legs of the staple blanks, a driver on said head movable up and down in the guide for shearing the staple blank which is advanced into the guide and driving it, said driver having angular wing portions to bear against the angularly disposed guide channels and apply pressure over the oblique legs, and ratchet means adjacent the guide for engaging the legs of each staple as it enters the guide and preventing the staple from cocking when it is being sheared.

17. Stapling apparatus for utilizing a connected series of fastener blanks in which the successive blanks are in contacting edge-to-edge relation, each having an embossed ridge thereon, a driver for shearing and driving each blank in succession, means for holding the connected series of blanks in position to present the end blank of the strip to the driver, a feeder movable back and forth over the top of the strip having a succession of ratchet teeth which ride over the ridges of the strip in one direction and catch said ridges in the other direction and advance the strip, and driver activated means for moving the feeder.

18. Stapling apparatus as defined in claim 17 in which the feeder comprises a bell crank having the ratchet teeth slidably supported on one arm, a cam roller on another arm, the driver mechanism having a cam surface which engages said roller on the driving stroke of the driver to move the feeder in a reverse direction in which the ratchet teeth are ineffective, and a spring for moving said bell crank in the opposite direction when the cam on the driver moves upwardly with respect to the roller, means for restraining the strip from moving when the ratchet teeth are ineffective and means for limiting the movement of the lever in the direction in which the ratchet teeth are effective.

References Cited in the file of this patent
UNITED STATES PATENTS

| | | |
|---|---|---|
| 1,195,304 | Wentworth | Aug. 22, 1916 |
| 1,377,295 | Wentworth | May 10, 1921 |
| 1,397,176 | Muth | Nov. 15, 1921 |
| 1,541,956 | Holzhausen | June 16, 1925 |
| 1,581,288 | Polzer | Apr. 20, 1926 |
| 2,150,127 | Passek | Mar. 7, 1939 |
| 2,237,438 | James | Apr. 8, 1941 |
| 2,392,327 | Lang | Jan. 8, 1946 |
| 2,440,479 | Lang | Apr. 27, 1948 |

UNITED STATES PATENT OFFICE
CERTIFICATE OF CORRECTION

Patent No. 2,845,626                                                    August 5, 1958

Joseph C. Lang

It is hereby certified that error appears in the above numbered patent requiring correction and that the said Letters Patent should read as corrected below.

In the grant, lines 2 and 12, and in the heading to the printed specification, lines 3 and 4, name of assignee, for "Bocil Corporation", each occurrence, read --Bocjl Corporation--; in the printed specification, column 8, line 5, for '"clocks"' read --"cocks"--; column 12, line 19, for "activated" read --actuated--.

Signed and sealed this 14th day of October 1958.

(SEAL)
Attest:

KARL H. AXLINE                                               ROBERT C. WATSON
Attesting Officer                                          Commissioner of Patents